United States Patent
Yanagitake et al.

(10) Patent No.: US 10,591,063 B2
(45) Date of Patent: Mar. 17, 2020

(54) SPIRAL WOUND GASKET

(71) Applicant: NIPPON PILLAR PACKING CO., LTD., Osaka (JP)

(72) Inventors: Yuji Yanagitake, Osaka (JP); Naoyuki Sawamoto, Osaka (JP); Hiroki Tanabe, Osaka (JP); Yuta Sato, Osaka (JP); Kiyoshi Toyazaki, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 0 days.

(21) Appl. No.: 16/023,615

(22) Filed: Jun. 29, 2018

(65) Prior Publication Data

US 2019/0011048 A1    Jan. 10, 2019

(30) Foreign Application Priority Data

Jul. 6, 2017   (JP) .................. 2017-132915

(51) Int. Cl.
   *F16J 15/12*     (2006.01)
   *F16L 23/16*     (2006.01)
   *F16J 15/08*     (2006.01)
   *F16J 15/10*     (2006.01)
   *F16L 23/18*     (2006.01)

(52) U.S. Cl.
   CPC ......... *F16J 15/125* (2013.01); *F16J 15/0887* (2013.01); *F16J 15/102* (2013.01); *F16J 15/104* (2013.01); *F16L 23/16* (2013.01); *F16L 23/18* (2013.01)

(58) Field of Classification Search
   CPC ...... F16J 15/125; F16J 15/0887; F16J 15/102; F16J 15/104; F16L 23/16; F16L 23/18
   See application file for complete search history.

(56) References Cited

U.S. PATENT DOCUMENTS

| | | | | |
|---|---|---|---|---|
| 4,363,847 | A * | 12/1982 | Hargreaves | D21H 5/18 162/181.6 |
| 5,683,091 | A * | 11/1997 | Isoe | F16J 15/125 277/610 |
| 5,997,007 | A | 12/1999 | Hanashima et al. | |
| 9,188,227 | B2 * | 11/2015 | Deluca | F16J 15/125 |
| 2012/0068415 | A1 * | 3/2012 | Deluca | F16J 15/125 277/312 |

FOREIGN PATENT DOCUMENTS

JP        S-693        1/1994

* cited by examiner

*Primary Examiner* — Gilbert Y Lee
(74) *Attorney, Agent, or Firm* — Renner, Otto, Boisselle & Sklar, LLP

(57) ABSTRACT

Provided is a spiral wound gasket that has improved conformability and that is capable of exhibiting sufficient sealability for flanges provided at joints, irrespective of the state of a gap between the flanges. The present invention provides a spiral wound gasket in which a laminate of a hoop member made of metal and a filler member is wound and integrated so as to have an opening at the center,
  wherein the hoop member has a cross-sectional shape with a bent portion, and
  V expressed by an equation (I) below is 0.5 to 2.4:

$$V = \frac{1}{r}\cos\left(\frac{\alpha}{2}\right), \quad (I)$$

where a bending angle constituting the bent portion is α (°), and a radius of curvature of the bent portion is r (mm).

4 Claims, 5 Drawing Sheets

SPIRAL WOUND GASKET

The present application is related to and claims priority under 35 U.S.C. § 119 to Japanese Application No. 2017-132915, filed 6 Jul. 2017, the entirety of which is hereby incorporated herein by reference.

BACKGROUND OF THE INVENTION

1. Field of the Invention

The present invention relates to a spiral wound gasket, and more particularly relates to a spiral wound gasket with improved sealability at pipe joints.

2. Description of the Related Art

Spiral wound gaskets are known in which a hoop member made of metal and formed into a V- or W-shape in cross section and a filler member made of inorganic paper mainly composed of rock wool, ceramic fiber, or the like are laid one on top of the other and wound together (see Japanese Examined Utility Model Publication No. H6-000693 and Japanese Laid-Open Patent Publication No. H10-141503, for example). Such spiral wound gaskets are used as sealing materials for achieving airtightness or liquid-tightness at joints of various types of piping.

For example, exhaust pipe joints for automobiles are manufactured through pressing or casting. However, especially when pressing is employed, sufficient dimensional accuracy cannot generally be achieved with press-formed products, or welding distortion may be caused during welding between a flange portion and a pipe portion. In a state in which such insufficient dimensional accuracy or distortion is present, even if a spiral wound gasket is disposed between flanges at joints, it is difficult to ensure uniform sealability.

Moreover, such flanges are likely to bend due to a fastening axial force of bolts, and it is therefore difficult to maintain a constant compression amount in the circumferential direction of a gasket. Also, in connection with recent reduction in fuel consumption of vehicles, there is a trend toward reduction of the plate thickness of a flange itself and the number of bolting positions so as to achieve weight and cost reduction. Thus, there is concern that bending of flanges will increase even more.

Therefore, there is demand for development of a spiral wound gasket that is capable of filling (hereinafter also referred to as "conforming to") a possible flange gap when compressed and thereby exhibiting sufficient sealability and that has even more improved conformability (i.e., that can allow for a large compression amount).

SUMMARY OF THE INVENTION

The present invention has been made to solve the above-described problems, and it is an object thereof to provide a spiral wound gasket that has improved conformability irrespective of the state of a gap between flanges provided at joints and that is capable of exhibiting sufficient sealability for those flanges.

The present invention provides a spiral wound gasket in which a laminate of a hoop member made of metal and a filler member is wound and integrated so as to have an opening at the center, wherein the hoop member has a cross-sectional shape with a bent portion, and V expressed by an equation (I) below is 0.5 to 2.4:

$$V = \frac{1}{r}\cos\left(\frac{\alpha}{2}\right), \quad (I)$$

where a bending angle of the hoop member at the bent portion is α (°), and a radius of curvature of the hoop member at the bent portion is r (mm).

In one embodiment, the bending angle α of the hoop member at the bent portion is 80° to 140°.

In one embodiment, the radius of curvature r of the hoop member at the bent portion is 0.2 mm to 1.2 mm.

In one embodiment, the hoop member is composed of stainless steel, and the filler member has a density of 1 g/cm³ to 1.2 g/cm³ and is composed of expanded graphite.

In one embodiment, the spiral wound gasket as a whole has a density of 2.1 g/cm³ to 2.4 g/cm³.

In one embodiment, when the spiral wound gasket is compressed with a surface pressure of 10 MPa, a bending angle α' of the hoop member at the bent portion that is compressed is 40° to 120°, and a radius of curvature r' of the hoop member at the compressed bent portion is 0.1 mm to 0.6 mm.

According to the present invention, it is possible to provide sufficient sealability for various flanges irrespective of the presence or absence and/or the size of a gap (that may be caused by, for example, variation in dimensional accuracy, undulation, or bending) between flanges provided at joints.

DESCRIPTION OF THE PREFERRED EMBODIMENTS

Hereinafter, the present invention will be described in detail using the drawings.

Figure 1:
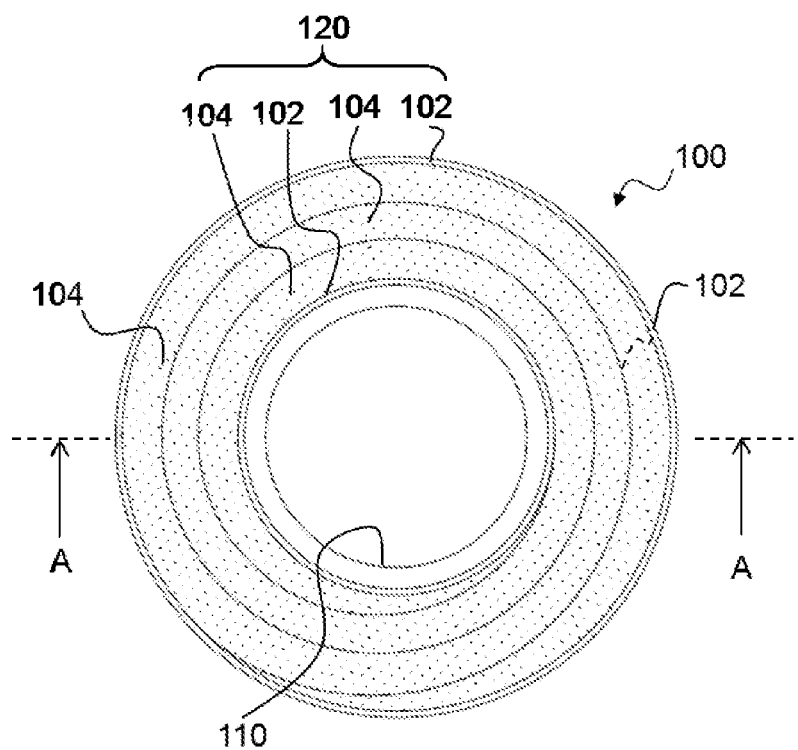
FIG. 1 schematically shows an example of a spiral wound gasket of the present invention; (a) is a plan view of the spiral wound gasket, and (b) is a cross-sectional view of the spiral wound gasket shown in the (a) taken along direction A-A.
Figure 1:
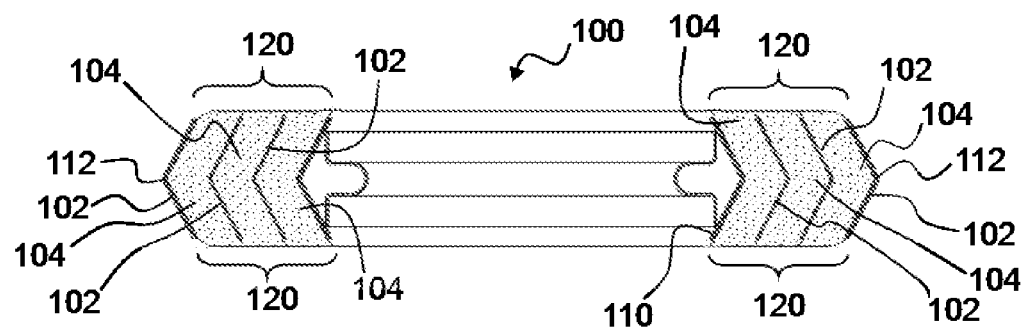

FIG. 1 schematically shows an example of a spiral wound gasket of the present invention.

As shown in (a) of FIG. 1, a spiral wound gasket 100 (hereinafter also referred to simply as "gasket 100") of the present invention is configured by winding and integrating a laminate of a hoop member 102 made of metal and a filler member 104 so as to have an opening 110 at the center. Note that, in (a) of FIG. 1, the hoop member 102 is shown on the outer periphery and the inner periphery of the gasket 100, but as will be described later, throughout the above-described winding, the hoop member 102 is disposed in a state in which an end portion of the filler member 104 at a gasket face 120 protrudes past an end portion of the hoop member 102, and the hoop member 102 is embedded between layers of the filler member 104 inside the gasket face 120.

The hoop member 102 is preferably a single thin strip of metal such as, for example, stainless steel, iron, nickel, or aluminum. It is preferable that the hoop member 102 is composed of stainless steel because stainless steel is easily available and has sufficient strength and heat resistance. Furthermore, the hoop member 102 has a thickness of, for example, 0.1 mm to 0.2 mm and preferably 0.1 mm to 0.15 mm, although the thickness of the hoop member 102 is not necessarily limited.

The filler member 104 is disposed between layers of the wound hoop member 102 within the gasket 100. The filler member 104 is preferably a single tape-like sheet composed of a material such as, for example, expanded graphite, inorganic paper (containing inorganic fibers such as rock wool or ceramic fiber, for example), and porous tetrafluoroethylene, as well as a combination of these. It is preferable that the filler member 104 is composed of expanded graphite because expanded graphite can impart a high degree of sealability to the gasket 100 despite its relatively low density and also has excellent heat resistance in itself.

The filler member 104 has a density of preferably 1.0 g/cm$^3$ to 1.2 g/cm$^3$. When the filler member 104 has a density within this range, a gasket 100 with a large compression amount can be obtained.

The opening 110 through which a liquid flow or a gas flow from a joint can pass is provided at the center of the gasket 100. The opening 110 preferably has a substantially circular shape or a substantially elliptical shape. The diameter of the opening 110 is set as appropriate in accordance with the inner diameter of pipes to which the gasket 100 is to be attached. In the embodiment shown in (a) of FIG. 1, the gasket 100 is formed by the hoop member 102 and the filler member 104 being laid one on top of the other (i.e., laminated) in the radial direction and wound together any desired number of turns around this opening 110 while a predetermined load (winding load) is applied thereto, and consequently, a gasket face 120 constituted by end portions of a plurality of layers of the hoop member 102 and end portions of a plurality of layers of the filler member 104 is formed at each of opposite end sides of the gasket 100 in the thickness direction.

The width of each gasket face 120 in the radial direction is, for example, 4 mm to 10 mm and preferably 5 mm to 8 mm, although this width is not necessarily limited.

FIG. 1(*b*) is a cross-sectional view of the gasket 100 shown in the (a) of FIG. 1 above taken along direction A-A.

According to the embodiment shown in FIG. 1(*b*), in the gasket 100, a portion in which the hoop member 102 and the filler member 104 are laminated (in FIG. 1(*b*), three layers of each of the members are laminated in the radial direction) is provided on the outer peripheral side of the opening 110. In FIG. 1(*b*), the hoop member 102 has a single bent portion (bend) 112 in the thickness direction of the gasket 100 and thereby has a V-shape in cross section.

In the gasket 100, the end portions of the filler member 104 protrude past the end portions of the hoop member 102 at each gasket face 120. That is to say, each gasket face 120 is constituted by the end portions of the filler member 104 that protrude from the end portions of the hoop member 102. The feature provided by the end portions of the filler member 104 protruding in this manner preferably appears at the gasket faces 120, which are opposite end faces (i.e., upper and lower faces in (b) of FIG. 1), of the gasket 100.

Figure 2:
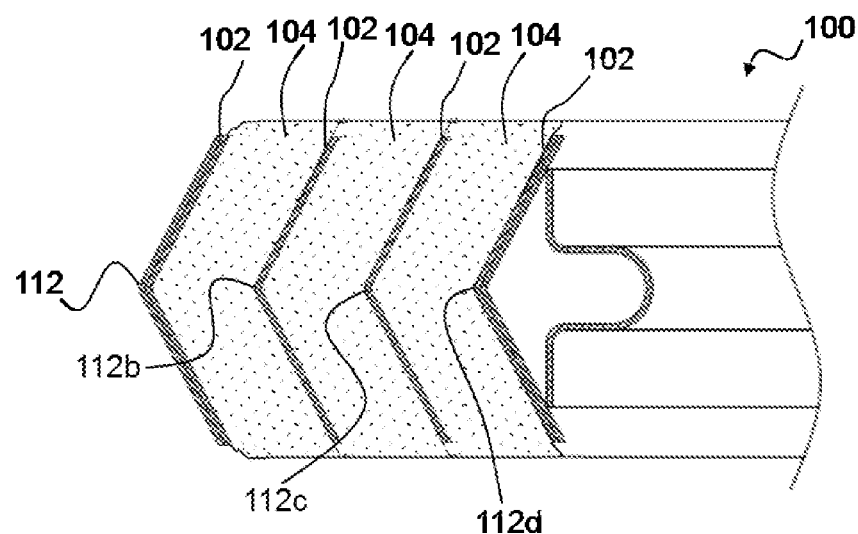
FIG. 2 is a partially-enlarged cross-sectional view of the gasket of the present invention shown in the (b) of FIG. 1.

FIG. 2 is a partially-enlarged cross-sectional view of the gasket 100 shown in the (b) of FIG. 1.

In the hoop member 102 that is shown in FIG. 2 and is wound a plurality of turns, bent portions 112, 112*b*, 112*c*, and 112*d* are preferably provided at substantially the same height in the thickness direction of the gasket 100. Moreover, the shortest distances between adjacent layers of the hoop member 102 (i.e., the shortest distance from the bent portion 112 to the bent portion 112*b*, the shortest distance from the bent portion 112*b* to the bent portion 112*c*, and the shortest distance from the bent portion 112*c* to the bent portion 112*d*; these distances correspond to the thicknesses of respective layers of the filler member 104) are preferably substantially the same.

Here, in order for the spiral wound gasket of the present invention to have a high degree of sealability between flanges provided at joints, it is considered important that, when the flanges are clamped together, the gasket can be compressed with a sufficient compression amount in accordance with the clamping (i.e., the gasket is sufficiently deformable under the clamping load applied to the gasket). Then, in order for the gasket of the present invention to have a sufficient compression amount, it is also considered necessary that each of the hoop member and the filler member, which constitute the gasket, has a large compression amount (i.e., the amount of deformation of each of the hoop member and the filler member under the clamping load applied to the gasket is large).

From these points of view, first, increasing the compression amount of the hoop member 102 will be examined.

Figure 3:
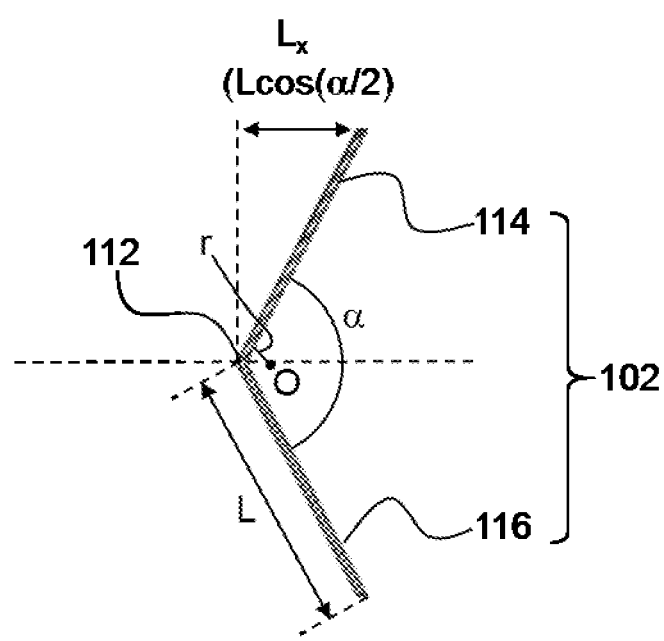
FIG. 3 is a cross-sectional view of a hoop member removed from the spiral wound gasket of the present invention shown in FIG. 2.

FIG. 3 is a cross-sectional view of the hoop member 102 removed from the gasket 100 shown in the (b) of FIG. 1.

The hoop member 102 shown in FIG. 3 is configured to be bent such that two hoop linear sections 114 and 116 meet at an angle at the bent portion 112. Moreover, it is preferable that the hoop linear sections 114 and 116 have substantially the same length L. In other words, the bent portion 112 is provided so as to be preferably located at the middle of the hoop linear sections 114 and 116. Moreover, in FIG. 3, the bent portion 112 is shown such that an angle α is formed by the hoop linear sections 114 and 116, and the bent portion 112 has a radius of curvature r. Here, the term "radius of curvature r" as used herein refers to the radius of curvature derived from an inner curve of the hoop member that constitutes the bent portion, and corresponds to the distance between the center O of an imaginary circle at the bent portion and the point of intersection of a perpendicular from the center O to the hoop linear section 114 or 116 with that hoop linear section. Furthermore, the term "inner curve of the hoop member" as used herein refers to a curve obtained from a surface (inner circumferential surface) of the hoop member 102 on a side (inner circumferential side) where an acute or obtuse angle of the angles between the two hoop linear sections 114 and 116 meeting at the bent portion is formed, and is distinguished from a curve (outer curve of the hoop member) obtained from a surface (outer circumferential surface) of the hoop member 102 on a side (outer circumferential side) where a reflex angle of the angles between the two hoop linear sections 114 and 116 meeting at the bent portion is formed.

In order to increase the compression amount of the hoop member 102, it is effective to cause plastic deformation by increasing the bending moment acting on the hoop member 102 constituting the gasket 100 and also increasing the stress concentration occurring in the bent portion. That is to say, in order to increase the bending moment acting on the hoop member 102, the length $L_x=L\times\cos(\alpha/2)$ of the gasket 100 in the radial direction at the hoop linear section 114 or 116 can be increased, and in order to increase the stress concentration occurring in the bent portion 112, the radius of curvature r of the bent portion 112 can be reduced. Therefore, if the length L of the hoop linear sections 114 and 116 is fixed, an increase in the bending moment acting on the hoop member 102 can be achieved by reducing the angle α of the bent portion 112 of the hoop member 102 (in order to increase the length $L_x$) and reducing the radius of curvature r.

Next, increasing the compression amount of the filler member 104 will be examined.

In order to increase the compression amount of the filler member 104, it is effective that the density of the filler member 104 in a state before the gasket 100 is clamped is small, and the density of the filler member 104 is varied by clamping the gasket 100. This can be achieved by, for example, reducing the winding load that is applied during winding of the laminate of the hoop member 102 and the filler member 104.

In the above-described manner, the compression amount of each of the hoop member 102 and the filler member 104 can be improved.

However, a case is assumed in which, if the angle α and/or the radius of curvature r of the bent portion 112 of the hoop member 102 is small, and the winding load applied to the gasket 100 is excessively small, the filler member 104 cannot deform so as to follow the shape of the hoop member 102, and in that case, for example, a gap may be formed between the hoop member 102 and the filler member 104 at the bent portion 112. Then, it is considered that, if there are multiple such gaps in the gasket 100, those gaps may constitute a leak path for a fluid to be sealed and thus cause leakage.

To address this issue, the inventor of the present invention found a specific condition for preventing a reduction in the compression amount of the gasket 100 during clamping and also preventing formation of a gap between the hoop member 102 and the filler member 104, using the angle α and the radius of curvature r of the bent portion.

That is to say, in the gasket 100, in its natural state (i.e., in an uncompressed state), V expressed by an equation (I) below is within a range of 0.5 to 2.4 and preferably 0.6 to 1.8:

$$V = \frac{1}{r}\cos\left(\frac{\alpha}{2}\right), \quad (I)$$

where the angle constituting a bent portion is α (°), and the radius of curvature of the bent portion is r (mm). When V expressed by the equation (I) above satisfies the above-described range, the compression amount of each of the hoop member 102 and the filler member 104 of the gasket 100 is improved, and formation of a gap between the hoop member 102 and the filler member 104 at the bent portion 112 and the like is prevented. Consequently, the gasket 100 can be compressed with a sufficient compression amount and thus can provide a high degree of sealability between flanges provided at joints.

Note that, in the gasket 100, the angle α of the bent portion 112 shown in FIG. 3 may be preferably an acute or obtuse angle and more preferably an obtuse angle, because a high degree of sealability can be provided between flanges provided at joints as described above. In other words, in the gasket 100, the angle α of the bent portion 112 shown in FIG. 3 may be preferably 80° to 140° and more preferably 90° to 130°.

Moreover, in the gasket 100, the radius of curvature r of the bent portion 112 shown in FIG. 3 may be preferably 0.2 mm to 1.2 mm and more preferably 0.3 mm to 0.9 mm, because a high degree of sealability can be provided between flanges provided at joints as described above.

Furthermore, in the gasket 100, in a state in which the gasket 100 is compressed with a surface pressure of 10 MPa, for example, the angle α' of the compressed bent portion 112 is preferably 40° to 120° and more preferably 50° to 110°. Note that the gasket 100 is designed such that the angle α' is smaller than the angle α of the bent portion 112 before compression (α'<α). Moreover, in the gasket 100, in a state in which the gasket 100 is compressed with a surface pressure of 10 MPa, for example, the radius of curvature r' of the compressed bent portion 112 is preferably 0.1 mm to 0.6 mm and more preferably 0.1 mm to 0.3 mm. Note that, in the present invention, the radius of curvature r' is smaller than the radius r of the bent portion 112 before compression (r'<r). In the present invention, the angle α' and the radius of curvature r' of the compressed bent portion 112 satisfy the respective relations above, so that the compression amount of the hoop member 102 can be improved, and formation of a gap between the hoop member 102 and the filler member 104 at the bent portion 112 and the like can be prevented.

The gasket 100 as a whole has a density of preferably 2.1 g/cm³ to 2.4 g/cm³. When the density of the gasket as a whole satisfies this range, a gasket 100 with a large compression amount can be produced if stainless steel is used for the hoop member 102 and expanded graphite is used for the filler member 104.

Figure 4:
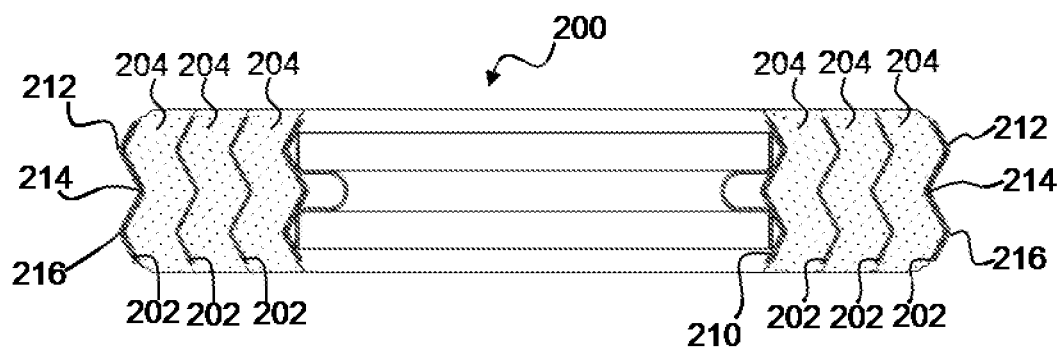
FIG. 4 is a cross-sectional view schematically showing another example of the spiral wound gasket of the present invention.

FIG. 4 is a cross-sectional view schematically showing another example of the spiral wound gasket of the present invention.

According to an embodiment shown in FIG. 4, in a spiral wound gasket 200 (hereinafter also referred to simply as "gasket 200") of the present invention, a portion in which a hoop member 202 and a filler member 204 are laminated (in FIG. 4, three layers of each of the hoop member 202 and the filler member 204 are laminated in the radial direction) is provided on the outer peripheral side of an opening 210. In FIG. 4, the hoop member 202 has three bent portions (bends) (i.e., a first bent portion 212, a second bent portion 214, and a third bent portion 216 in this order from the upper side to the lower side in FIG. 4) in the thickness direction of the gasket 200, and has a W-shape in cross section as a whole.

Figure 5:
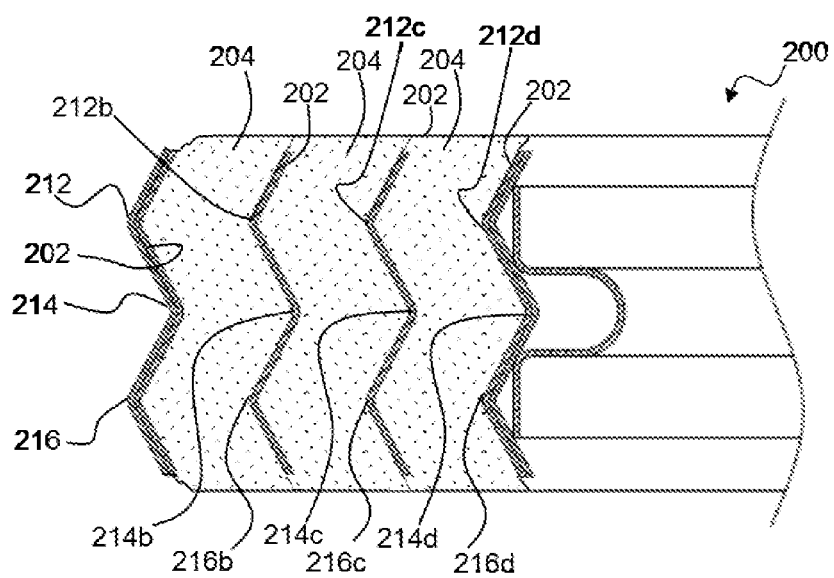
FIG. 5 is a partially-enlarged cross-sectional view of the spiral wound gasket of the present invention shown in FIG. 4.

FIG. 5 is a partially-enlarged cross-sectional view of the gasket 200 shown in FIG. 4.

In the hoop member 202 that is shown in FIG. 5 and wound a plurality of turns, first bent portions 212, 212b, 212c, and 212d are preferably provided at substantially the same height in the thickness direction of the gasket 200. Moreover, second bent portions 214, 214b, 214c, and 214d are also preferably provided at substantially the same height in the thickness direction of the gasket 200. Furthermore, third bent portions 216, 216b, 216c, and 216d are also preferably provided at substantially the same height in the thickness direction of the gasket 200.

On the other hand, the shortest distances between adjacent layers of the hoop member 202 at the first bent portions (i.e., the shortest distance from the first bent portion 212 to the first bent portion 212b, the shortest distance from the first bent portion 212b to the first bent portion 212c, and the shortest distance from the first bent portion 212c to the first bent portion 212*d*) are preferably substantially the same. Moreover, the shortest distances between adjacent layers of the hoop member 202 at the second bent portions (i.e., the shortest distance from the second bent portion 214 to the second bent portion 214*b*, the shortest distance from the second bent portion 214*b* to the second bent portion 214*c*, and the shortest distance from the second bent portion 214*c* to the second bent portion 214*d*) are preferably substantially the same. Furthermore, the shortest distances between adjacent layers of the hoop member 202 at the third bent portions (i.e., the shortest distance from the third bent portion 216 to the third bent portion 216*b*, the shortest distance from the third bent portion 216*b* to the third bent portion 216*c*, and the shortest distance from the third bent portion 216*c* to the third bent portion 216*d*) are preferably substantially the same.

Figure 6:
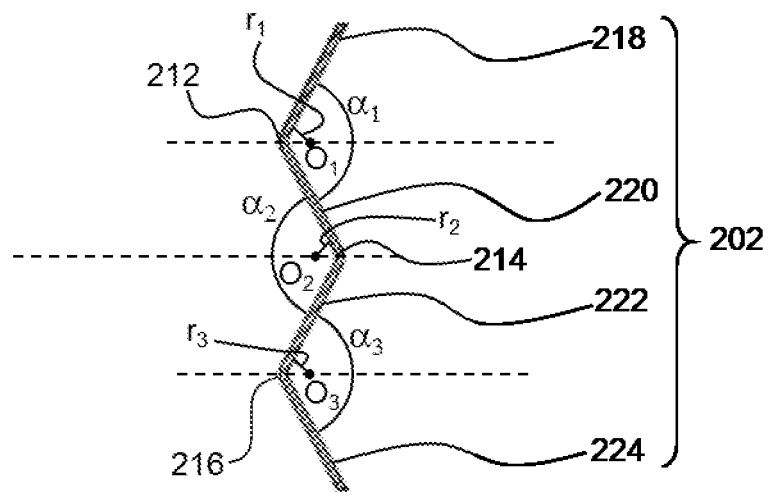
FIG. 6 is a cross-sectional view of a hoop member removed from the spiral wound gasket of the present invention shown in FIG. 4.

FIG. 6 is a cross-sectional view of the hoop member 202 removed from the gasket 200 shown in FIG. 4.

The hoop member 202 shown in FIG. 6 is bent such that two hoop linear sections 218 and 220 meet at an angle at the first bent portion 212, two hoop linear sections 220 and 222 meet at an angle at the second bent portion 214, and two hoop linear sections 222 and 224 meet at an angle at the third bent portion 216. Also, the lengths of the individual hoop linear sections 218, 220, 222, and 224 preferably satisfy any of the following relations:

(1) The lengths of the hoop linear sections 218, 220, 222, and 224 are substantially the same;

(2) The lengths of the hoop linear sections 218 and 224 are substantially the same, and the lengths of the hoop linear sections 220 and 222 are substantially the same; and (3) The lengths of the hoop linear sections 218 and 220 are substantially the same, and the lengths of the hoop linear sections 222 and 224 are substantially the same.

Moreover, in the hoop member 202 shown in FIG. 6, an angle $\alpha_1$ is formed between the hoop linear sections 218 and 220 at the first bent portion 212, and the first bent portion 212 is formed so as to have a radius of curvature $r_1$ with a center $O_1$ being the center of the imaginary circle. Moreover, an angle $\alpha_2$ is formed between the hoop linear sections 220 and 222 at the second bent portion 214, and the second bent portion 214 is formed so as to have a radius of curvature $r_2$ with a center $O_2$ being the center of the imaginary circle. Furthermore, an angle $\alpha_3$ is formed between the hoop linear sections 222 and 224 at the third bent portion 216, and the third bent portion 216 is formed so as to have a radius of curvature $r_3$ with a center $O_3$ being the center of the imaginary circle.

Note that, in the present invention, the angles $\alpha_1$, $\alpha_2$, and $\alpha_3$ are independent of one another, and are each preferably 80° to 140° and more preferably 90° to 130°. The angles $\alpha_1$, $\alpha_2$, and $\alpha_3$ may be the same or may be different from one another.

In the present invention, the radii of curvature $r_1$, $r_2$, and $r_3$ are independent of one another, and are each preferably 0.2 mm to 1.2 mm and more preferably 0.3 mm to 0.9 mm. The radii of curvature $r_1$, $r_2$, and $r_3$ may be the same or may be different from one another.

According to the present invention, when any one of combinations of an angle and a radius of curvature that constitute the hoop member 202 shown in FIG. 6 (i.e., a combination of $\alpha_1$ and $r_1$; a combination of $\alpha_2$ and $r_2$; and a combination of $\alpha_3$ and $r_3$) is represented by an angle $\alpha$ (°) and a radius of curvature $r$ (mm), the gasket 200 shown in FIG. 4 also is configured such that V expressed by the equation (I) below falls within the range of 0.5 to 2.4 and preferably 0.6 to 1.8:

$$V = \frac{1}{r}\cos\left(\frac{\alpha}{2}\right). \tag{I}$$

Since V expressed by the equation (I) above satisfies the above-described range, in the gasket 200 shown in FIG. 4 as well, the compression amount of each of the hoop member 202 and the filler member 204 is improved, and formation of a gap between the hoop member 202 and the filler member 204 at the first bent portion 212 and the like is prevented. Consequently, the gasket 200 can be compressed with a sufficient compression amount and thus can provide a high degree of sealability between flanges provided at joints.

Figure 7:
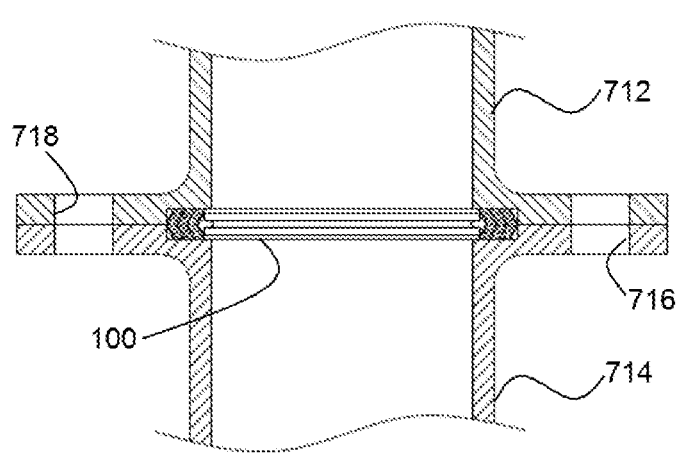
FIG. 7 is a cross-sectional view for schematically illustrating a state in which the spiral wound gasket of the present invention shown in the (b) of FIG. 1 is disposed at pipe joints.

FIG. 7 is a cross-sectional view for schematically illustrating a state in which the gasket 100 shown in the (b) of FIG. 1 is disposed at pipe joints.

The gasket 100 is disposed between flanges of two pipe joints 712 and 714, for example. Then, bolts are inserted into holes 716 and 718 that are provided in the flanges of the pipe joints 712 and 714, and the flanges are clamped together with nuts and fixed. Thus, the gasket 100 can exhibit conformability with respect to the flanges of the pipe joints 712 and 714 and provide a high degree of sealability to the connection between the pipe joints 712 and 714.

Figure 8:
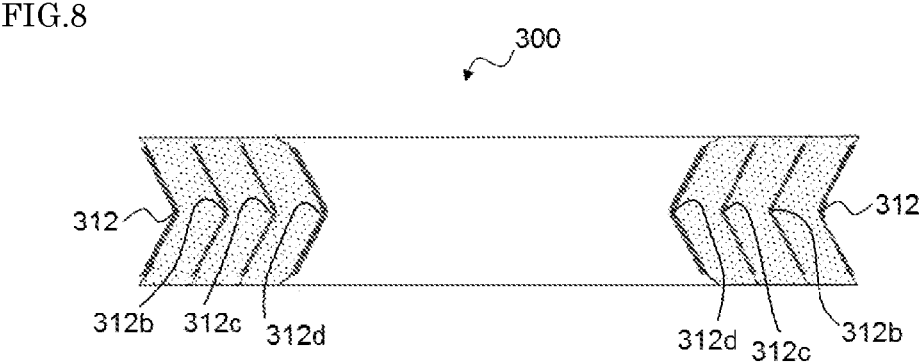
FIG. 8 is a cross-sectional view schematically showing yet another example of the spiral wound gasket of the present invention.

Note that, in the description of the foregoing embodiments, FIGS. 1 to 7 show that the bent portions 112 to 112*d* or 212 to 212*d* and 216 to 216*d* of the V- or W-shaped cross section of the hoop member 102 or 202 have bent shapes that are displaced outward in the radial direction; however, the spiral wound gasket of the present invention may also have, for example, the form of a gasket 300 in which bent portions 312, 312*b*, 312*c* and 312*d* are displaced inward in the radial direction as shown in FIG. 8.

EXAMPLES

Hereinafter, the present invention will be more specifically described by means of examples. It is to be understood that the present invention is not limited to the examples below.

Example 1: Production and Evaluation of Test Gaskets Using Hoop Members Having W-Shape in Cross Section Hoop members having a W-shape in cross section and having angles and radii of curvature of bent portions shown in Table 1 were produced by drawing SUS304 band steel with a thickness of 0.13 mm and a width of 7.1 mm. Note that, in the thus produced hoop members having a W-shape in cross section, all of the angles $\alpha_1$, $\alpha_2$, and $\alpha_3$ shown in FIG. 6 were the same, and all of the hoop linear sections 218, 220, 222, and 224 had the same lengths. A piece of expanded graphite tape with a thickness of 1.0 mm and a width of 7.5 mm was laminated on one surface of each hoop member, and the laminate was spirally wound three turns while a load of 10 kgf was applied thereto using a pressure roll, to produce a test gasket. In this manner, a plurality of test gaskets were produced for each of the hoop members (hoop members with different angles $\alpha$ and radii of curvature $r$ of the bent portions). Note that the obtained test gaskets had an opening with a diameter of 49 mm at their center, and the outer periphery and the inner periphery of each test gasket were reinforced using SUS304 band steel similar to that of the hoop members. As a result, with respect to all of the produced test gaskets, the density of the filler member was within a range of 1.0 to 1.2 g/cm³, and the density of the test gasket as a whole was within a range of 2.1 to 2.4 g/cm³.

The obtained test gaskets were compressed with a surface pressure of 10 MPa using a universal testing machine (UH-300KNA manufactured by Shimadzu Corporation), and the compression amount (amount of change) at that time was measured using a dial gauge (DT-20D manufactured by Kyowa Electronic Instruments Co., Ltd.). With respect to each of the test gaskets, if the compression amount was within a range of 1.8 mm to 2.2 mm, the test gasket was evaluated as "good", and if the compression amount was outside this range, the test gasket was evaluated as "poor". The obtained results are shown in sections denoted by "C (Compression)" in Table 1.

After that, each test gasket was cut along the diameter direction, and the state of the cross section of a laminated structure formed by the hoop member and the filler member being wound together was visually observed. If no gap was observed between the hoop member and the filler member, the test gasket was evaluated as "good", and if a gap was observed therebetween, the test gasket was evaluated as "poor". The obtained results are shown in sections denoted by "G (Gap)" in Table 1.

As shown in Table 1, if the angles α of the bent portions of the hoop members were within a range of 90° to 130°, and the radii of curvature r were within a range of 0.3 mm to 0.9 mm, test gaskets (in Table 1, the gaskets that fall into a category "(i)") excluding those in portions enclosed by thick lines had an appropriate compression amount within the range of 1.8 mm to 2.2 mm and had no gap between the hoop member and the filler member, and were judged as being favorable as gaskets. Note that it can be seen that all of the gaskets that were judged as being favorable had a V value within the range of 0.5 to 2.4.

In contrast, it can be seen that test gaskets that fall into a category "(ii)" in Table 1 had a gap between the hoop member and the filler member, and the compression amount of test gaskets that fall into a category "(iii)" in Table 1 was smaller than the target range (1.8 mm to 2.2 mm).

Then, each of the test gaskets under the categories (i), (ii), and (iii) obtained above was cut in half along the diameter direction. The cut test gaskets were compressed with a surface pressure of 10 MPa using a universal testing

TABLE 1

| Radii of curvature: r(mm) | Angle: α (°) | | | | | | |
|---|---|---|---|---|---|---|---|
| | 80 | 90 | 100 | 110 | 120 | 130 | 140 |
| 0.2 | C: Good<br>G: Poor<br>(ii) | C: Good<br>G: Poor<br>(ii) | C: Good<br>G: Poor<br>(ii) | C: Good<br>G: Poor<br>(ii) | C: Good<br>G: Poor<br>(ii) | C: Good<br>G: Good<br>(i) | C: Good<br>G: Good<br>(i) |
| V value | 3.8 | 3.5 | 3.2 | 2.9 | 2.5 | 2.1 | 1.7 |
| 0.3 | C: Good<br>G: Poor<br>(ii) | C: Good<br>G: Good<br>(i) | C: Good<br>G: Good<br>(i) | C: Good<br>G: Good<br>(i) | C: Good<br>G: Good<br>(i) | C: Good<br>G: Good<br>(i) | C: Good<br>G: Good<br>(i) |
| V value | 2.6 | 2.4 | 2.1 | 1.9 | 1.7 | 1.4 | 1.1 |
| 0.4 | C: Good<br>G: Good<br>(i) | C: Good<br>G: Good<br>(i) | C: Good<br>G: Good<br>(i) | C: Good<br>G: Good<br>(i) | C: Good<br>G: Good<br>(i) | C: Good<br>G: Good<br>(i) | C: Good<br>G: Good<br>(i) |
| V value | 1.9 | 1.8 | 1.6 | 1.4 | 1.3 | 1.1 | 0.9 |
| 0.5 | C: Good<br>G: Good<br>(i) | C: Good<br>G: Good<br>(i) | C: Good<br>G: Good<br>(i) | C: Good<br>G: Good<br>(i) | C: Good<br>G: Good<br>(i) | C: Good<br>G: Good<br>(i) | C: Good<br>G: Good<br>(i) |
| V value | 1.5 | 1.4 | 1.3 | 1.1 | 1.0 | 0.8 | 0.7 |
| 0.6 | C: Good<br>G: Good<br>(i) | C: Good<br>G: Good<br>(i) | C: Good<br>G: Good<br>(i) | C: Good<br>G: Good<br>(i) | C: Good<br>G: Good<br>(i) | C: Good<br>G: Good<br>(i) | C: Good<br>G: Good<br>(i) |
| V value | 1.3 | 1.2 | 1.1 | 1.0 | 0.8 | 0.7 | 0.6 |
| 0.7 | C: Good<br>G: Good<br>(i) | C: Good<br>G: Good<br>(i) | C: Good<br>G: Good<br>(i) | C: Good<br>G: Good<br>(i) | C: Good<br>G: Good<br>(i) | C: Good<br>G: Good<br>(i) | C: Good<br>G: Good<br>(i) |
| Vvalue | 1.1 | t0 | 0.9 | 0.8 | 0.7 | 0.6 | 0.5 |
| 0.8 | C: Good<br>G: Good<br>(i) | C: Good<br>G: Good<br>(i) | C: Good<br>G: Good<br>(i) | C: Good<br>G: Good<br>(i) | C: Good<br>G: Good<br>(i) | C: Good<br>G: Good<br>(i) | C: Poor<br>G: Good<br>(iii) |
| V value | 1.0 | 0.9 | 0.8 | 0.7 | 0.6 | 0.5 | 0.4 |
| 0.9 | C: Good<br>G: Good<br>(i) | C: Good<br>G: Good<br>(i) | C: Good<br>G: Good<br>(i) | C: Good<br>G: Good<br>(i) | C: Good<br>G: Good<br>(i) | C: Good<br>G: Good<br>(i) | C: Poor<br>G: Good<br>(iii) |
| V value | 0.9 | 0.8 | 0.7 | 0.6 | 0.6 | 0.5 | 0.4 |
| 1.0 | C: Good<br>G: Good<br>(i) | C: Good<br>G: Good<br>(i) | C: Good<br>G: Good<br>(i) | C: Good<br>G: Good<br>(i) | C: Good<br>G: Good<br>(i) | C: Poor<br>G: Good<br>(iii) | C: Poor<br>G: Good<br>(iii) |
| V value | 0.8 | 0.7 | 0.6 | 0.6 | 0.5 | 0.4 | 0.3 |
| 1.1 | C: Good<br>G: Good<br>(i) | C: Good<br>G: Good<br>(i) | C: Good<br>G: Good<br>(i) | C: Good<br>G: Good<br>(i) | C: Good<br>G: Good<br>(i) | C: Poor<br>G: Good<br>(iii) | C: Poor<br>G: Good<br>(iii) |
| V value | 0.7 | 0.6 | 0.6 | 0.5 | 0.5 | 0.4 | 0.3 |
| 1.2 | C: Good<br>G: Good<br>(i) | C: Good<br>G: Good<br>(i) | C: Good<br>G: Good<br>(i) | C: Good<br>G: Good<br>(i) | C: Poor<br>G: Good<br>(iii) | C: Poor<br>G: Good<br>(iii) | C: Poor<br>G: Good<br>(iii) |
| V value | 0.6 | 0.6 | 0.5 | 0.5 | 0.4 | 0.4 | 0.3 |

V value: a value calculated with Formula (I), i.e., $1/r \times \cos(\alpha/2)$.
C: Compression
G: Gap machine (UH-300KNA manufactured by Shimadzu Corporation), and the angles α' and the radii of curvature r' of the bent portions of the hoop members when compressed were measured through observation of the cross section.

categories (ii) and (iii) showed an amount of leakage of more than 5 cc/min, and it was confirmed that the sealing performance of those test gaskets was inferior to that of the test gaskets under the category (i) above. Table 2 shows the obtained results.

TABLE 2

|  | Examples | Comparative Examples | |
| --- | --- | --- | --- |
| Categories in Table 1 | (i) | (ii) | (iii) |
| Hoop member | SUS304 Band steel having W-shape in cross section | Same as the left | Same as the left |
| Filler member | Expanded graphite tape | Same as the left | Same as the left |
| Winding load (kgf) | 10 | Same as the left | Same as the left |
| Filler density (g/cm$^3$) | 1.0 to 1.2 | Same as the left | Same as the left |
| Gasket density (g/cm$^3$) | 2.1 to 2.4 | Same as the left | Same as the left |
| Angle (°) of bent portion (no-load) | 80 to 140 | 80 to 120 | 120 to 140 |
| Radius of curvature r (mm) of bent portion (no-load) | 0.2 to 1.2 | 0.2 to 0.3 | 0.8 to 1.2 |
| V value (1/r × cos(α/2)) α: angle (°) of bent portion (no-load) r: radius of curvature (mm) of bent portion (no-load) | 0.5 to 2.4 | More than 2.4 | Less than 0.5 |
| Compression characteristics (mm) | 1.8 to 2.2 | 1.8 to 2.2 | Less than 1.8 ⇒ Poor |
| Angle α' (°) of bent portion after compression | 40 to 120 | 40 to 110 | 100 to 130 |
| Radius of curvature r' (mm) of bent portion after compression | 0.1 to 0.6 | 0.1 to 0.2 | 0.6 to 1.0 |
| Whether gap was observed between hoop member and filler member | Not observed | Observed | Not observed |
| Amount of leakage of fluid | Not more than 5 cc/min with respect to all the test gaskets | More than 5 cc/min with respect to all the test gaskets | More than 5 cc/min with respect to all the test gaskets |

In all of the test gaskets under the category (i), when compressed, the angles α' of the bent portions were within a range of 40° to 120°, and the radii of curvature r' were within a range of 0.1 mm to 0.6 mm. Moreover, in all of the test gaskets under the category (ii), when compressed, the angles α' of the bent portions were within a range of 40° to 110°, and the radii of curvature r' were within a range of 0.1 mm to 0.2 mm. Furthermore, in all of the test gaskets under the category (iii), when compressed, the angles α' of the bent portions were within a range of 100° to 130°, and the radii of curvature r' were within a range of 0.6 mm to 1.0 mm. Table 2 shows the obtained results.

Furthermore, each test gasket under the category (i) was held between FF flanges of pipe joints, and the flanges were fixed together with a predetermined clamping pressure. Then, compressed air serving as a fluid was passed through the pipe joints with an internal pressure of 49 kPa, and the amount (amount of leakage) of fluid leaking from a portion where the gasket was held between the flanges was measured using a mass flowmeter. All of the test gaskets under the category (i) showed an amount of leakage of not more than 5 cc/min when the fluid was passed therethrough, and it was confirmed that those test gaskets had excellent sealing performance as gaskets. Table 2 shows the obtained results.

Furthermore, with respect to the test gaskets classified into the category (ii) or (iii) in Table 1, the amount of leakage of fluid between FF flanges was measured in the same manner as described above. All of the test gaskets under the As shown in Table 2, it can be seen that, among the test gaskets that were produced as described above, the gaskets under the category (i), which had a V value within the range of 0.5 to 2.4, satisfied the target range (1.8 mm to 2.2 mm) of the compression amount, had no gap between the hoop member and the filler member, and had excellent sealing performance.

Example 2: Production and Evaluation of Test Gaskets Using Hoop Members Having V-Shape in Cross Section Hoop members having a V-shape in cross section and having various angles and radii of curvature of bent portions as shown in Table 1 were produced by drawing SUS304 band steel similar to that of Example 1. Note that, in the produced hoop members having a V-shape in cross section, the hoop linear sections 114 and 116 shown in FIG. 3 had the same lengths. Test gaskets were produced in the same manner as in Example 1 except that these hoop members were used.

With respect to the obtained test gaskets, the compression amount was measured, and the state of the cross section of the laminated structure was observed, in the same manner as in Example 1. As a result, it was confirmed that test gaskets whose V values calculated from the equation (I) were within the range of 0.5 to 2.4 had an appropriate compression amount within the range of 1.8 mm to 2.2 mm, had no gap between the hoop member and the filler member, and were favorable.

Moreover, with respect to the test gaskets having a V value within the range of 0.5 to 2.4, the amount of leakage of fluid between FF flanges was measured in the same manner as in Example 1. It was confirmed that all of the test gaskets having a V value within the above-described range had an amount of leakage of less than 5 cc/min and had excellent sealing performance.

Example 3: Production and Evaluation of Test Gaskets With Filler Member Being Changed Except that a piece of inorganic paper (mainly composed of rock wool) with a thickness of 1.0 mm and a width of 7.5 mm was used as a filler member instead of the piece of expanded graphite tape, test gaskets (RW) using this filler member and hoop members having a W-shape in cross section and having various angles and radii of curvature of bent portions as shown in Table 1 were produced in the same manner as in Example 1.

On the other hand, except that a piece of inorganic paper (mainly composed of ceramic fiber) with a thickness of 1.0 mm and a width of 7.5 mm was used as a filler member instead of the piece of expanded graphite tape, test gaskets (CF) using this filler member and hoop members having a W-shape in cross section and having various angles and radii of curvature of bent portions as shown in Table 1 were produced in the same manner as in Example 1.

With respect to the obtained test gaskets (RW) and (CF), the compression amount was measured, and the state of the cross section of the laminated structure was observed, in the same manner as in Example 1. As a result, it was confirmed that, whichever filler member was used, test gaskets whose V values calculated from the equation (I) were within the range of 0.5 to 2.4 had an appropriate compression amount within the range of 1.8 mm to 2.2 mm, had no gap between the hoop member and the filler member, and were favorable.

Moreover, with respect to the test gaskets whose V values were within the range of 0.5 to 2.4, of the above-described test gaskets (RW) and (CF), the amount of leakage of fluid between FF flanges was measured in the same manner as in Example 1. It was confirmed that, with respect to all of the test gaskets having a V value within the above-described range, the amount of leakage of fluid was increased compared with that of the gaskets under the category (i) that were obtained in Example 1 and that had a V value within the range of 0.5 to 2.4, and none of those test gaskets had as good sealing performance as the gaskets under the category (i).

What is claimed is:

1. A spiral wound gasket in which a laminate of a hoop member made of metal and a filler member is wound and integrated so as to have an opening at the center,
    wherein the hoop member has a cross-sectional shape with a bent portion, and
    V expressed by an equation (I) below is 0.5 to 2.4:

$$V = \frac{1}{r}\cos\left(\frac{\alpha}{2}\right), \quad (I)$$

where a bending angle of the hoop member at the bent portion is $\alpha$ (°), and a radius of curvature of the hoop member at the bent portion is r (mm);
    wherein the bending angle $\alpha$ of the hoop member at the bent portion is 100° to 130°; and
    wherein the radius of curvature r of the hoop member at the bent portion is 0.3 mm to 0.9 mm.

2. The spiral wound gasket of claim 1, wherein the hoop member is composed of stainless steel, and the filler member has a density of 1 g/cm$^3$ to 1.2 g/cm$^3$ and is composed of expanded graphite.

3. The spiral wound gasket of claim 1, wherein the spiral wound gasket as a whole has a density of 2.1 g/cm$^3$ to 2.4 g/cm$^3$.

4. The spiral wound gasket of claim 1, wherein when the spiral wound gasket is compressed with a surface pressure of 10 MPa, a bending angle $\alpha'$ of the hoop member at the bent portion that is compressed is 40° to 120°, and a radius of curvature r' of the hoop member at the compressed bent portion is 0.1 mm to 0.6 mm.

* * * * *